US012639382B2

(12) United States Patent
Lee et al.

(10) Patent No.: US 12,639,382 B2
(45) Date of Patent: May 26, 2026

(54) DEVICE FOR PROVIDING TOURISM INFORMATION AND METHOD THEREOF

(71) Applicant: ELECTRONICS AND TELECOMMUNICATIONS RESEARCH INSTITUTE, Daejeon (KR)

(72) Inventors: Jiwon Lee, Daejeon (KR); Do-Won Nam, Daejeon (KR); Sung-Won Moon, Daejeon (KR); Jung Soo Lee, Daejeon (KR); Ung-Yeon Yang, Daejeon (KR); Wonyoung Yoo, Daejon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/801,121

(22) Filed: Aug. 12, 2024

(65) Prior Publication Data
US 2025/0173381 A1 May 29, 2025

(30) Foreign Application Priority Data
Nov. 27, 2023 (KR) ........................ 10-2023-0166778

(51) Int. Cl.
*G06F 16/9535* (2019.01)

(52) U.S. Cl.
CPC ................................ *G06F 16/9535* (2019.01)

(58) Field of Classification Search
CPC ............. G06F 16/9535; G06F 16/9536; G06F 16/9538; G06F 16/9532; G06F 16/951; G06F 16/953
See application file for complete search history.

(56) References Cited

U.S. PATENT DOCUMENTS

| | | | |
|---|---|---|---|
| 2011/0153613 A1 | 6/2011 | Lee | |
| 2015/0143435 A1 | 5/2015 | Kim et al. | |
| 2016/0242010 A1* | 8/2016 | Parulski .................. | H04W 4/30 |
| 2024/0370505 A1* | 11/2024 | Devaux ............... | G06F 16/9532 |

FOREIGN PATENT DOCUMENTS

| | | |
|---|---|---|
| KR | 20-2012-0003597 U | 5/2012 |
| KR | 10-1397936 B1 | 5/2014 |
| KR | 10-1724211 B1 | 4/2017 |
| KR | 10-2019-0105161 A | 9/2019 |
| KR | 10-2006452 B1 | 10/2019 |
| KR | 10-2037981 B1 | 10/2019 |
| KR | 10-2021-0017941 A | 2/2021 |

* cited by examiner

*Primary Examiner* — Kris E Mackes

(57) ABSTRACT

A device for providing tourism information and a method thereof are proposed. The method of operating an electronic device configured to provide the tourism information about a cultural heritage includes obtaining user information, providing first tourism information corresponding to the user information from a pre-stored tourism database, and providing second tourism information on the basis of the user information, wherein the second tourism information is information related to the first tourism information.

10 Claims, 6 Drawing Sheets

DEVICE FOR PROVIDING TOURISM INFORMATION AND METHOD THEREOF

CROSS REFERENCE TO RELATED APPLICATION

The present application claims priority to Korean Patent Application No. 10-2023-0166778, filed Nov. 27, 2023, the entire contents of which are incorporated herein for all purposes by this reference.

BACKGROUND OF THE INVENTION

Field of the Invention

The present disclosure relates to a technology for providing tourism information and, more particularly, to a device for providing relevant tourism information by reflecting the interests of visitors and a method thereof.

Description of the Related Art

Existing cultural heritage interpretation services are making efforts to introduce artificial intelligence (AI), but these services are provided in the form of repeatedly delivering cultural interpretation content, which is the same and manually entered in advance, to a plurality of visitors without considering the characteristics of each visitor.

As an example, the Ewha Womans University Museum reproduces the facial expressions, movements, and voices of announcers, who are real people, with AI and uses them for cultural interpretation, but the descriptions for collections are at the level of reproducing pre-entered text through voice, so the cultural interpretation content is required to be input manually. In addition, the Jeju Aerospace Museum provides cultural interpretation services based on video, image, and text for surrounding exhibits through beacon-based positioning, but does not support storytelling services customized for visitors.

Attempts to provide smart cultural heritage interpretation are also underway overseas. The University of Rochester, USA, has developed a question-and-answer (Q&A) docent technology at the level of chatbot based on designated keywords on AR/web/app devices. Collaborating with Google, the British Museum visualizes collections by dividing them into five categories according to topics and provides a web-based curation service for a corresponding work when the specific collection is selected by a visitor. However, as the same in all these cases, their services are unable to present a variety of stories according to the preferences or purposes of visitors.

Apart from such cases described above, service providers such as Netflix and YouTube provide a function of selecting and providing recommended content according to user preferences, but do not provide services beyond the level of content recommendation.

SUMMARY OF THE INVENTION

An objective of the present disclosure is to support visitors to view a cultural heritage in a more three-dimensional way by interactively storytelling the cultural heritage according to purposes/interests for each visitor.

According to an exemplary embodiment of the present disclosure, there is provided a method of operating an electronic device configured to provide tourism information about a cultural heritage, the method including: obtaining user information; providing first tourism information corresponding to the user information from a pre-stored tourism database; and providing second tourism information on the basis of the user information, wherein the second tourism information may be information related to the first tourism information.

In addition, the second tourism information may be natural language-based interpretation information for the first tourism information.

In addition, the pre-stored tourism database may include tourism data about the cultural heritage, and the tourism data may be divided into visual information and non-visual information.

In addition, the user information may include information about a visitor who is viewing the cultural heritage, and include at least one of personal information, interest information, history information, and restricted information of the visitor.

In addition, the providing of the first tourism information may include: setting a first recommendation criterion on the basis of the user information; determining at least one cultural heritage as a recommendation target on the basis of the first recommendation criterion; and generating recommendation information about the recommendation target.

In addition, the providing of the second tourism information may include: generating customized interpretation information for the user corresponding to the user information on the basis of the recommendation information and the user information, and the customized interpretation information may be generated on the basis of at least one of the personal information, history information, interest information, and restricted information of the user.

According to the exemplary embodiment of the present disclosure, there is provided an electronic device configured to provide tourism information about a cultural heritage, the electronic device including: a transceiver; and at least one control unit operably connected to the transceiver, wherein the at least one control unit may be configured to perform steps including: obtaining user information; providing first tourism information corresponding to the user information from a pre-stored tourism database; and providing second tourism information on the basis of the user information, and the second tourism information is information related to the first tourism information.

In addition, the second tourism information may be natural language-based interpretation information for the first tourism information.

In addition, the pre-stored tourism database may include tourism data about the cultural heritage, and the tourism data may be divided into visual information and non-visual information.

In addition, the user information may include information about a visitor who is viewing the cultural heritage, and include at least one of the personal information, interest information, history information, and restricted information of the visitor.

In addition, in order to perform the providing of the first tourism information, the at least one control unit may be configured to further perform steps including: setting a first recommendation criterion on the basis of the user information; determining at least one cultural heritage as a recommendation target on the basis of the first recommendation criterion; and generating recommendation information about the recommendation target.

In addition, in order to perform the providing of the second tourism information, the at least one control unit is configured to perform a step of generating customized interpretation information for the user corresponding to the user information on the basis of the recommendation information and the user information, and the customized interpretation information may be generated on the basis of at least one of the personal information, history information, interest information, and restricted information of the user.

The embodiment of the present disclosure selects interpretation topics for a cultural heritage on the basis of the gender, age, interests, past viewing history, etc. of visitors, and accordingly, generates and provides customized cultural heritage interpretation content in a natural language form to maintain the context and topics of the cultural interpretation, so that digital exhibition halls, museums, or the like within a metaverse may provide cultural heritage viewing storytelling services, which are personalized, and continued visits to the exhibition halls may be encouraged by providing various stories according to the visit history and areas of interests of the visitor who has visited the actual exhibition halls or museums, thereby having an advantage in that opportunities to enjoy national culture may be supported and viewing satisfaction may be maximized by improving the quality of intelligent docent services.

DETAILED DESCRIPTION OF THE INVENTION

Figure 1:
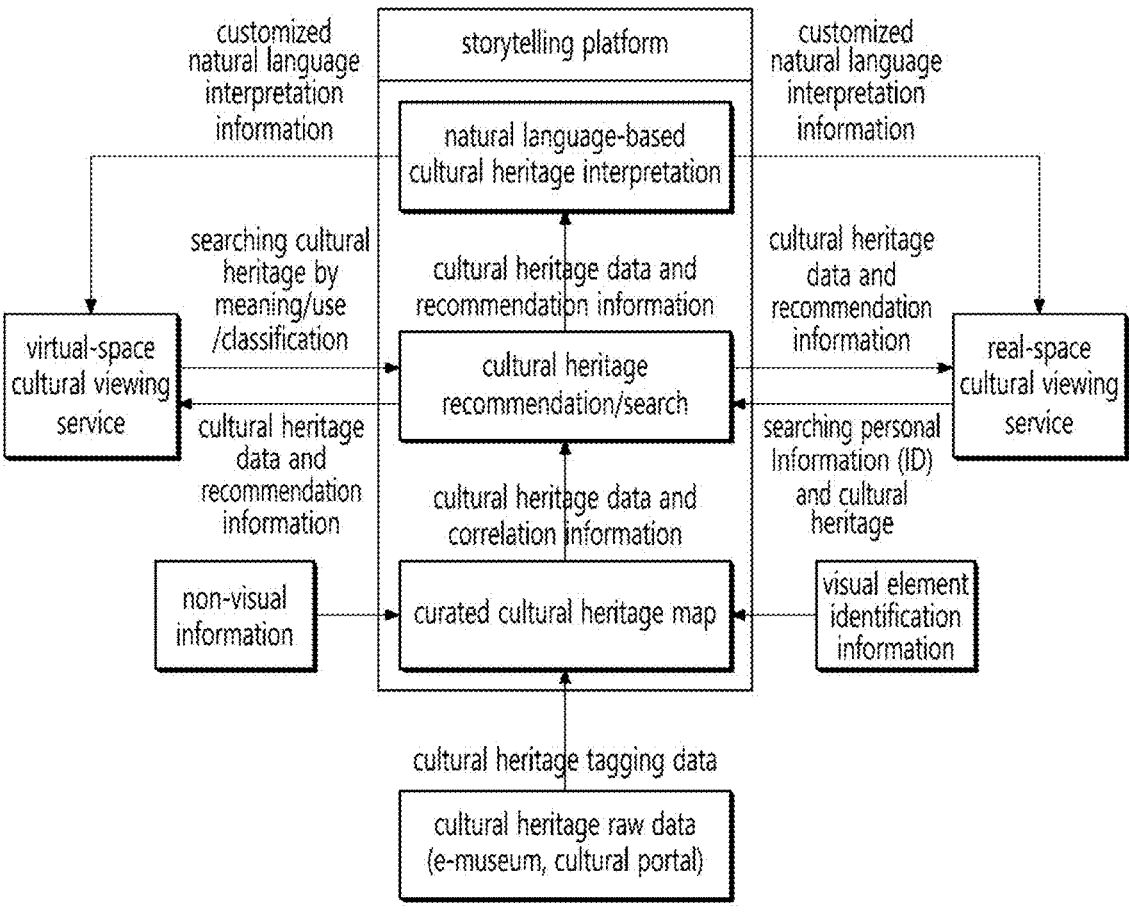
FIG. 1 is a view illustrating a configuration diagram of a storytelling platform implemented by an electronic device according to an exemplary embodiment of the present disclosure.

Phrases such as "in some exemplary embodiments" or "in one exemplary embodiment" that appear in various places in the present specification do not necessarily all refer to the same exemplary embodiment.

Some exemplary embodiments of the present disclosure may be represented by functional block components and various processing steps. Some or all of these functional blocks may be implemented in various numbers of hardware and/or software components that perform specific functions. For example, the functional blocks of the present disclosure may be implemented by one or more microprocessors, or may be implemented by circuit components for prescribed functions. In addition, for example, the functional blocks of the present disclosure may be implemented in various programming or scripting languages. The functional blocks may be implemented as algorithms that are executed on one or more processors. In addition, the present disclosure may employ conventional technologies for electronic environment setup, signal processing, and/or data processing. Terms such as "mechanism", "element", "means", and "configuration" may be used broadly and are not limited to mechanical and physical components.

In addition, connection lines or connection members between components shown in the drawings merely exemplify functional connections and/or physical or circuit connections. In an actual device, connections between components may be represented by various replaceable or additional functional connections, physical connections, or circuit connections.

According to the exemplary embodiment of the present disclosure, an electronic device provides tourism information about a cultural heritage.

The electronic device may be a server or user terminal, which provides or uses a cultural heritage storytelling service. In this case, the electronic device may implement a cultural heritage storytelling platform.

There is disclosed a configuration method and linking method of the cultural heritage storytelling platform implemented by the electronic device according to the exemplary embodiment of the present disclosure.

Specifically, the electronic device may recommend a customized cultural heritage as a viewing object, or may provide a customized interpretation service for the viewing object on the basis of user information about a visitor to the cultural heritage.

Through this way, storytelling is customized to the visitor according to various factors of interests and various stories about a cultural heritage, so that the levels of immersion for a new visitor is increased and topics different from storytelling previously consumed by the visitor is recommended for the returning visitor, thereby enabling the visitor to consume new content even when the visitor revisits multiple times. In addition, existing services, which are limited to exhibition curation within an exhibition hall, may be expanded to provide nation-wide exhibition storytelling services through linking cultural heritage information between the exhibition halls.

Here, the cultural heritage storytelling platform is a platform for providing cultural heritage viewing services in various real or virtual spaces, and in order to support these services, the platform includes: a curated cultural heritage map that is an ontology-based database; cultural heritage recommendation/search for intelligently searching the database and recommending relevant information; and natural language-based cultural heritage interpretation for effectively transmitting the relevant information about a recommended/searched cultural heritage to a visitor.

FIG. 1 is a view illustrating a configuration diagram of a storytelling platform implemented by an electronic device according to the exemplary embodiment of the present disclosure.

Referring to FIG. 1, the storytelling platform may be divided into three functional areas. For example, a first functional area may be a curated cultural heritage map, a second functional area may be a cultural heritage recommendation/search, and a third functional area may be a natural language-based cultural heritage interpretation.

The first functional area, which is the curated cultural heritage map, may refer to structured data in which cultural heritage data for actual storytelling curation is stored in an ontology. Specifically, the curated cultural heritage map may refer to a tourism database including cultural heritages or tourism information about the cultural heritages.

Here, the ontology may be understood as a way of expressing relationships between objects and various concepts in a form that may be processed by a computer. In addition, the curation may refer to a service that collects and/or processes, or organizes a lot of diverse information and content so as to display the information and content in a neatly organized and easily accessible manner.

In addition, the curated cultural heritage map may obtain and store cultural heritage raw data and visual/non-visual information. The cultural heritage raw data may be pre-stored information about cultural heritages.

The second functional area, which is the cultural heritage recommendation/search, may include a function of obtaining search commands for cultural heritages and providing customized cultural heritage information corresponding to the search commands. Specifically, the search commands may be included in request information for the cultural heritages obtained on the basis of cultural viewing services.

The cultural viewing services may be divided into a virtual-space cultural viewing service and a real-space cultural viewing service. The storytelling platform may obtain search commands for cultural heritages according to the meaning, use, and classification thereof from the virtual-space cultural viewing service, and may obtain search commands for the cultural heritages according to users' personal information from the real-space cultural viewing service. Thereafter, the storytelling platform may provide cultural heritage data and recommendation information to each cultural viewing service or the third functional area in response to the obtained search commands. In addition, storytelling elements may refer to various stories or information, which are related to the cultural heritages and used to generate cultural interpretation content.

For example, when information about a user's age and visit history is obtained from the user in a real space where a specific cultural heritage exists on the basis of cultural viewing services, the storytelling platform may select, on the basis of the user's age, at least one cultural heritage well understandable by the user, and select a cultural heritage that the user has never viewed among the at least one cultural heritage on the basis of the user's visit history information, so that recommendation information for the selected cultural heritage may be generated and provided to the user.

The third functional area, which is the natural language-based cultural heritage interpretation, includes a function of generating customized natural language interpretation information for the cultural heritage determined according to the recommendation information obtained from the second functional area. In this case, the storytelling platform may take the user information into account. The generated customized natural language interpretation information may be provided to the cultural viewing services.

Specifically, in order to generate customized natural language interpretation information, a technology for generating and delivering cultural interpretation content in a natural language form may be applied, focusing on those that suit the interests of visitors among the vast amount of information and stories related to cultural heritages. In addition, the customized natural language interpretation information may be generated on the basis of at least one of the user's personal information, history information, interest information, and restricted information. The personal information may be user-specific information such as the user's age, name, and gender, and the interest information may be information about the user's preferred interpretation, voice, speaking style, etc. In addition, the history information may be information about the user's history of using the storytelling platform, and the restricted information may be information about content that the user does not desire to hear as interpretation.

In addition, expressions included in a label definition diagram described below in the present disclosure may be understood on the basis of the content below.

S (in a label definition diagram): an expression abbreviated for a system System, meaning the highest level of design (Level 1, L1)

M (in the label definition diagram): an expression abbreviated for a module Module, meaning a second highest level of the design (Level 2, L2)

B (in the label definition diagram): an expression abbreviated for a block Block, meaning a third highest level of the design (Level 3, L3)

Figure 2:
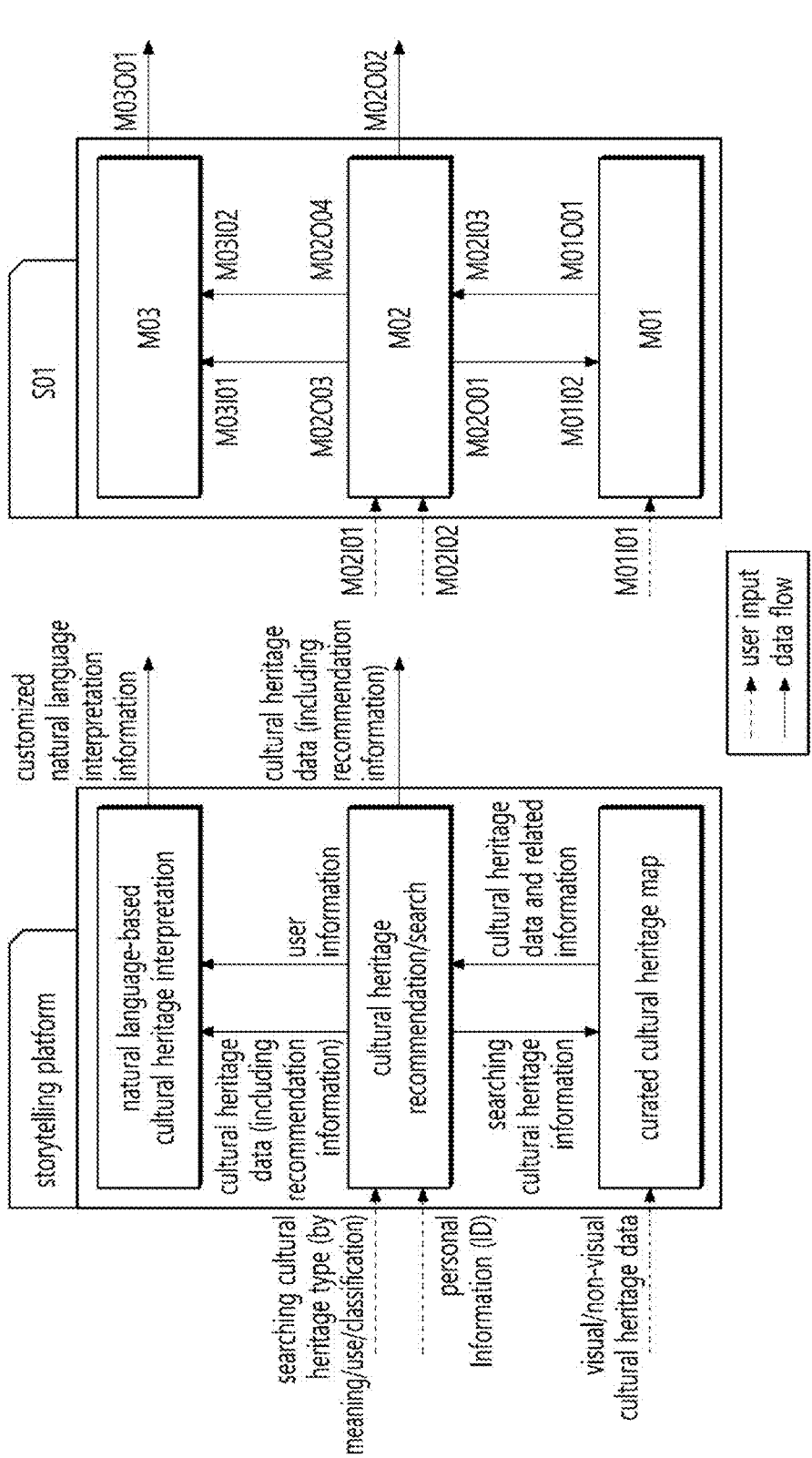
FIG. 2 is a view illustrating a configuration diagram and a label definition diagram of a cultural heritage storytelling platform according to the exemplary embodiment of the present disclosure.

I (in the label definition diagram): an expression abbreviated for input data Input data, meaning the input data of M, B, and F N (in the label definition diagram): an expression abbreviated for nested data Nested data, meaning a data flow inside M and B O (in the label definition diagram): an expression abbreviated for output data Output data, meaning the output data of M, B, and F FIG. 2 is a view illustrating a configuration diagram and a label definition diagram of a cultural heritage storytelling platform according to the exemplary embodiment of the present disclosure.

Referring to FIG. 2, a data flow regarding a cultural heritage storytelling platform system S01 may be schematized and referred to as L1 design. The cultural heritage storytelling platform may include a curated cultural heritage map that is input into a database according to a cultural heritage ontology by collecting visual/non-visual cultural heritage data in advance. In addition, cultural heritage recommendations and cultural heritage searches may be provided on the basis of the curated cultural heritage map and user input, and the provided results may optionally be provided with rich interpretation information based on a natural language.

The function description for each module is as follows.

Curated cultural heritage map M01: a structured database in which cultural heritage data composed visually and non-visually on a cultural heritage ontology defined by an administrator is pre-input by a system administrator, the structured database being able to provide a list of instances including attribute information of a corresponding cultural heritage and a list of related cultural heritages upon receiving a request for searching information about the cultural heritage from a cultural heritage recommendation/search module.

Cultural heritage recommendation/search M02: a function of receiving two types of input from a user and recommending or searching related cultural heritage information to be provided for the user First, after receiving information such as an ID capable of identifying a user and receiving a cultural heritage name that the user desires to search, not only storytelling information about the corresponding cultural heritage and a list of related cultural heritages that may be of interest based on the user's preferences through a curated cultural heritage map, but also recommendation information with defined weights may be provided.

Second, detailed search information may be provided after searching for information about the related cultural heritages through the curated cultural heritage map by receiving a search expression based on visual characteristics such as meaning/use/classification of a cultural heritage as an input from the user.

Natural language-based cultural heritage interpretation M03: this may receive, as an input, the detailed information about the cultural heritage and related recommended cultural heritage information from the cultural heritage recommendation/search module, and may generate and provide cultural heritage storytelling interpretation information, which is in the natural language form customized to the user's interests.

Among the input/output information defined in the label definition diagrams, Input data is as follows.

M01I01—visual/non-visual cultural heritage attribute information that is input into a cultural heritage ontology structure initially or intermittently defined by a system administrator.

M02I01—a user's search request information for each cultural heritage category or a specific cultural heritage M02I02—personal information such as ID that may specify a user and confirm related interests of the user In addition, among the input/output information defined in the label definition diagrams, Output data is as follows.

M02O02—attribute information about a cultural heritage of interest, a list of related recommended cultural heritages, and weight information M03O01—natural language-based cultural heritage interpretation information for a cultural heritage of interest An L2 design for the three modules described above are respectively shown in FIGS. 3 to 5.

Figure 3:
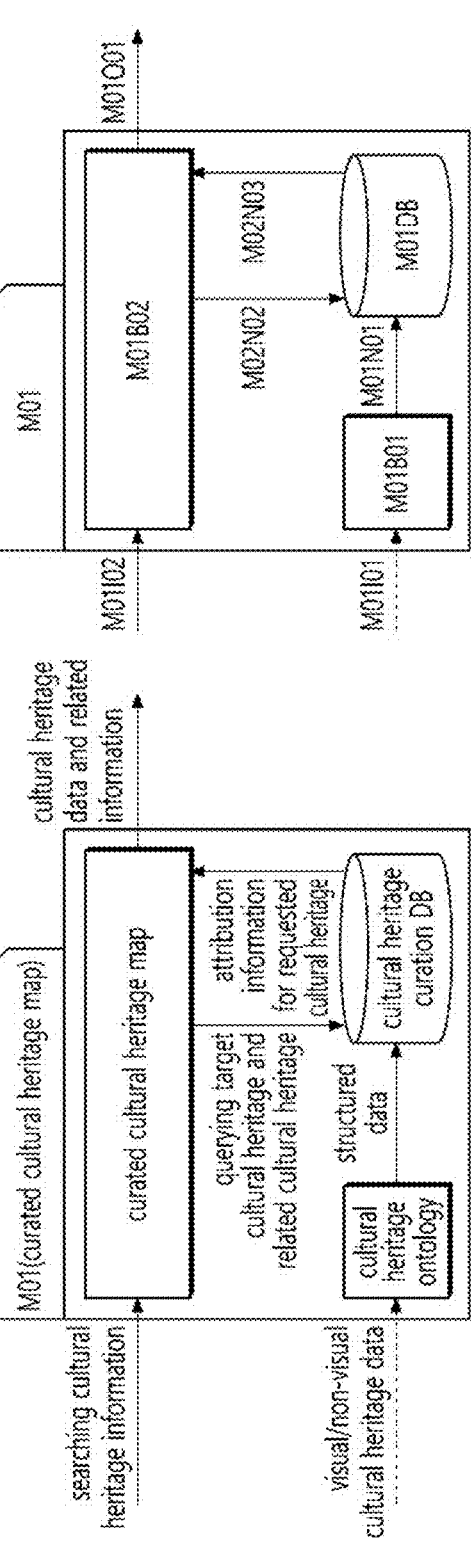
FIG. 3 is a view illustrating a configuration diagram and a label definition diagram of a cultural heritage curator map module according to the exemplary embodiment of the present disclosure.

FIG. 3 is a view illustrating a configuration diagram and a label definition diagram of a cultural heritage curator map module according to the exemplary embodiment of the present disclosure.

Description: FIG. 3 illustrates a structured database in which M01I01 of pre-inputting, by a system administrator, cultural heritage data composed visually and non-visually on the cultural heritage ontology defined by an administrator is performed, wherein M01I02 of receiving a request for searching information about a cultural heritage from M02 may be performed to provide an instance including attribute information of the corresponding cultural heritage and a list M02O01 of related cultural heritages.

The functions of the cultural heritage curator map module are as follows.

Cultural heritage ontology M01B01: a structure defined to organize cultural heritage attribute information in accordance with storytelling, wherein when an administrator inputs visual/non-visual cultural heritage information, cultural heritage attribute data may be recorded in a cultural heritage curation DB M01DB in accordance with the definition format of M01B01.

Cultural heritage curation DB MO1DB: a database in which actual cultural heritage data is stored in accordance with the structure of the defined cultural heritage ontology M01B01, wherein an operation may be performed in the form of a query and a response for a target cultural heritage from the curated cultural heritage map M01B02 to M01DB.

Curated cultural heritage map M01B02: a block for holding and managing logical connectivity for all cultural heritages included in the cultural heritage curation DB M01DB on the basis of the defined cultural heritage ontology M01B01, wherein M01I02 of inputting an information search for a specific cultural heritage or a cultural heritage list may be performed, a target cultural heritage and related cultural heritages may be derived on the basis of correlation so as to request and collect data to and from the cultural heritage curation DB, and then M01O01 of outputting related information may be performed.

Input data among the input/output information of the cultural heritage curator map module is as follows.

M01I01—visual/non-visual cultural heritage attribute information that is input into the cultural heritage ontology structure initially or intermittently defined by the system administrator.

M01I02—search request information for a cultural heritage

In addition, Nested data among the input/output information of the cultural heritage curator map module is as follows.

M01N01—cultural heritage attribute information organized in accordance with the defined cultural heritage ontology structure M01N02—search request information about cultural heritage attributes M01N03—attribute information about a search-requested cultural heritage In addition, Output data among the input/output information of the cultural heritage curator map module is as follows.

Figure 4:
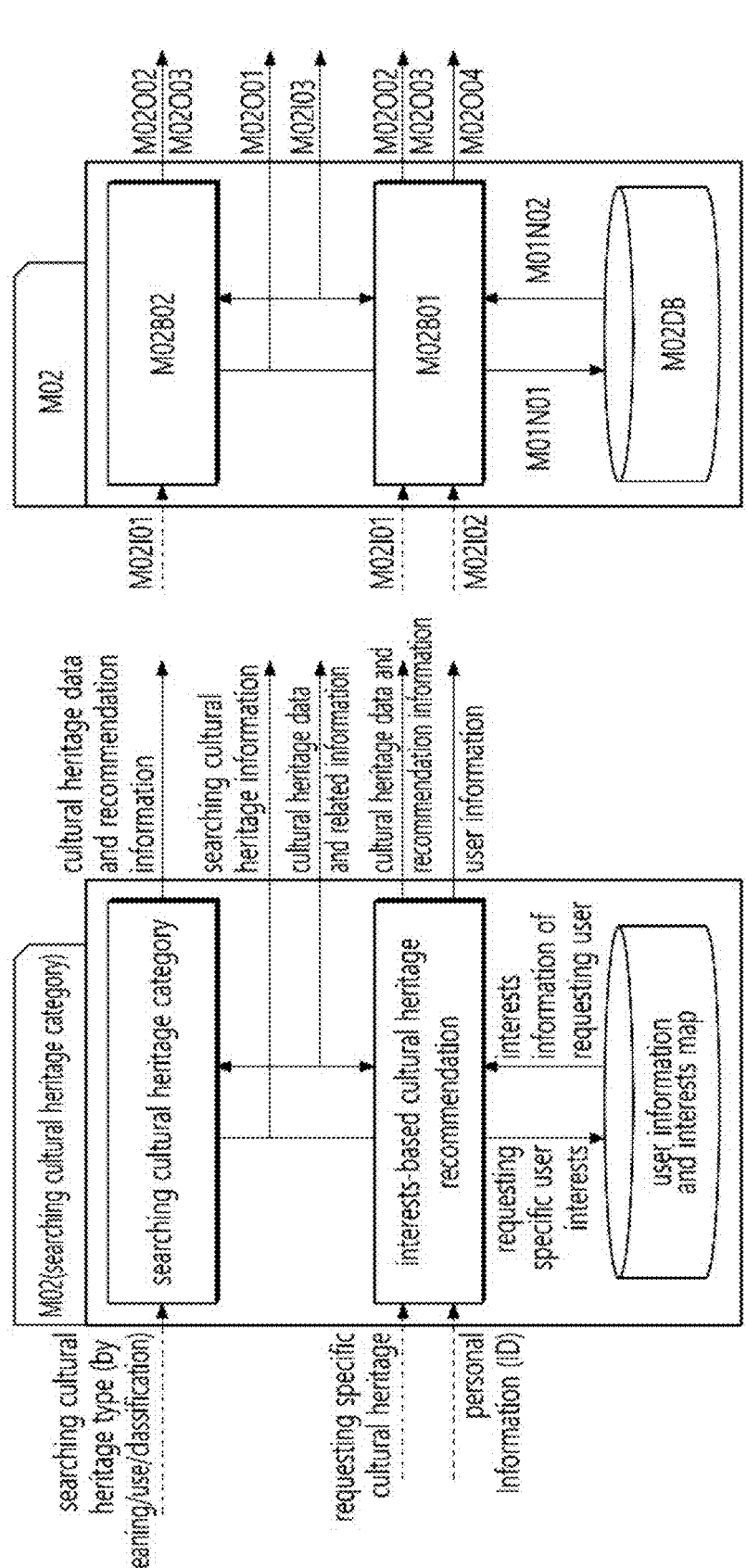
FIG. 4 is a view illustrating a configuration diagram and a label definition diagram for a cultural heritage recommendation/search module according to the exemplary embodiment of the present disclosure.

M01O01—attribute information about the search-requested cultural heritage and related cultural heritages thereof FIG. 4 is a view illustrating a configuration diagram and a label definition diagram for a cultural heritage recommendation/search module according to the exemplary embodiment of the present disclosure.

Description: related cultural heritage information may be recommended or searched by receiving two types of input from a user.

First, after receiving inputs of information M02I02 such as ID that may identify a user and a cultural heritage name M02I01 that the user desires to search, M02O02 of outputting may be performed for not only storytelling information about the corresponding cultural heritage and a list of related cultural heritages that may be of interest based on the user's preferences through M01, but also recommendation information with defined weights. The related information M02O03 and user information M02O04 may be provided to M03.

Second, M02O02 of outputting detailed search information may be performed and related information M02O03 may be provided to M03 after searching for information about the related cultural heritages through M01 by receiving a search expression based on visual characteristics such as meaning/use/classification of a cultural heritage as an input M02I01 from the user.

The functions of the cultural heritage recommendation/search module are as follows.

Interests-based cultural heritage recommendation M02B01: after receiving, as inputs from a user, personal information M02I02 (i.e., an ID and the like) that may identify a user and receiving an information request M02I01 for a specific cultural heritage, first, M02O01 of requesting the cultural heritage information search to M01 is performed to receive a cultural heritage list M02O01 related to the corresponding cultural heritage information. After generating visitor interests-based cultural heritage recommendation information on the basis of the user information and the user's interests M02N02 obtained through M02N01 of requesting to an interests map M02DB, M02O02 and M02O03 of outputting the cultural heritage recommendation information together with the detailed information about the corresponding cultural heritage may be performed and M02O04 of transmitting the user information may also be performed.

User information and interests map M02DB: a logical map structured to store and manage personal information and interests, which are required for cultural heritage recommendations for each user, wherein when M02N01 of requesting a cultural heritage to a corresponding platform is performed by a user, M02N02 of transmitting interests information of the corresponding user may be performed, and the interests information for the corresponding user may be accumulated and managed.

Cultural heritage classification search M02B02: a search expression based on visual characteristics such as meaning/use/classification of a cultural heritage may be received as an input M02I01 from a user, a query M02O01 may be sent to M01, M02I03 of receiving and then M02O02 and M02O03 of outputting the list and related information for the cultural heritage having corresponding attributes may be performed.

Input data among the input/output information of the cultural heritage recommendation/search module is as follows.

M02I01—a user's search request information for a cultural heritage classification search expression or a specific cultural heritage M02I02—personal information such as ID that may specify a user and confirm related interests M02I03—attribute information about a search-requested cultural heritage and related cultural heritages Nested data among the input/output information of the cultural heritage recommendation/search module is as follows.

M02N01—interests request information for a specific user

M02N02—interests information for the corresponding user

Output data among the input/output information of the cultural heritage recommendation/search module is as follows.

M02O01—search request information for a cultural heritage

Figure 5:
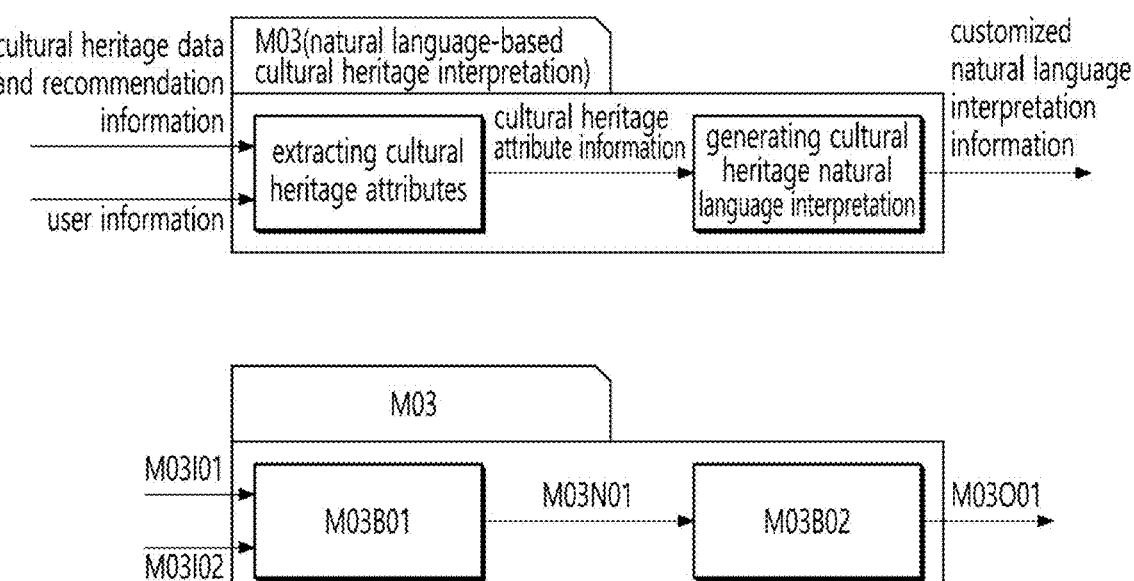
FIG. 5 is a view illustrating a configuration diagram and a label definition diagram for a natural language-based cultural heritage interpretation module according to the exemplary embodiment of the present disclosure.

M02O02—attribute information about a cultural heritage of interest, a list of related recommended cultural heritages, and weight information M02O03—attribute information about a cultural heritage of interest, a list of related recommended cultural heritages, and weight information M02O04—user information such as age and interests FIG. 5 is a view illustrating a configuration diagram and a label definition diagram for a natural language-based cultural heritage interpretation module according to the exemplary embodiment of the present disclosure.

Description: attribute information about a cultural heritage of interest requested by a user, a list of related recommended cultural heritages, weight information M03I01 are received, and information M03I02 that may take into account a user's preferences is received, so that an interpretation on the cultural heritage of interest may be generated in a natural language according to the user's interests, preferences, and age, thereby performing M03O01 of outputting the interpretation.

The functions of the natural language-based cultural heritage interpretation module are as follows.

Cultural heritage attribute extraction M03B01: cultural heritage data, recommendation information M03I01, and user information M03I02 are received from M02, so that cultural heritage attributes to be used for natural language generation is extracted according to the user's age, interests, and preferences, thereby performing M03N01 of transmitting the cultural heritage attributes to a block M03B02 for generating a cultural heritage natural language interpretation.

Performing M03B02 of generating cultural heritage natural language interpretation: M03N01 of receiving cultural heritage attribute information to be used for the natural language generation is performed from the block M03B01 for extracting cultural heritage attributes, so as to generate and perform M03O01 of outputting the cultural heritage attribute information in a natural language.

Input data among the input/output information of the natural language-based cultural heritage interpretation module is as follows.

M03I01—attribute information about a cultural heritage of interest, a list of related recommended cultural heritages, and weight information M03I02—user information such as age and interests Nested data among the input/output information of the natural language-based cultural heritage interpretation module is as follows.

M03N01—cultural heritage attribute information filtered according to user preferences Output data among the input/output information of the natural language-based cultural heritage interpretation module is as follows.

Figure 6:
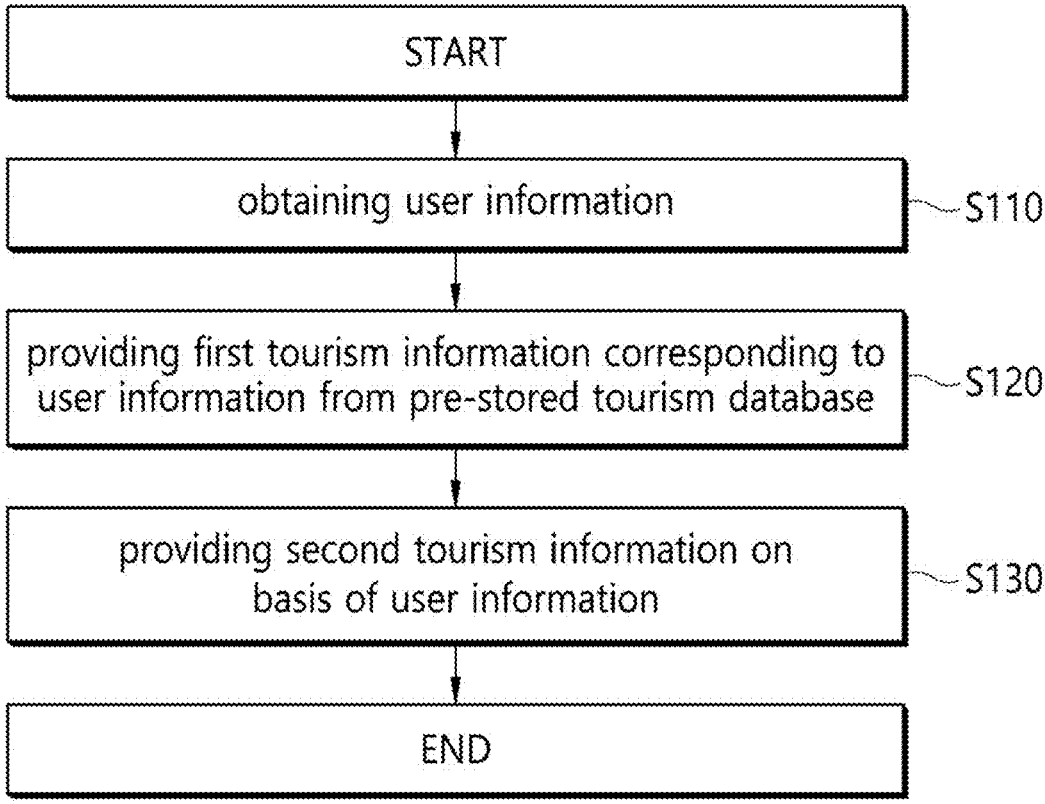
FIG. 6 is a view illustrating a flowchart of the electronic device according to the exemplary embodiment of the present disclosure.

M03O01—natural language-based cultural heritage interpretation information for a cultural heritage of interest FIG. 6 is a view illustrating a flowchart of the electronic device according to the exemplary embodiment of the present disclosure.

In step S110, an electronic device obtains user information.

Here, the user information includes information about a visitor who is viewing cultural heritages, and includes at least one of personal information, interest information, history information, and restricted information of the visitor.

In step S120, the electronic device provides first tourism information corresponding to the user information from a pre-stored tourism database.

Here, the pre-stored tourism database includes tourism data about a cultural heritage, and the tourism data may be divided into visual information and non-visual information.

In addition, the electronic device sets a first recommendation criterion on the basis of the user information, determines at least one cultural heritage as a recommendation target on the basis of the first recommendation criterion, and generates recommendation information about the recommendation target.

In step S130, the electronic device provides second tourism information on the basis of the user information.

Here, the second tourism information may be information related to the first tourism information. In addition, the second tourism information may be natural language-based interpretation information for the first tourism information.

In addition, the electronic device may generate customized interpretation information for the user corresponding to the user information on the basis of the recommendation information and the user information.

Here, the customized interpretation information may be generated on the basis of the at least one of the user's personal information, history information, interest information, and restricted information.

The above-described content is a specific exemplary embodiment for realizing the present disclosure. The present disclosure will include not only the above-described exemplary embodiment, but also exemplary embodiments that are simply designed or may be easily changed. In addition, the present disclosure will also include techniques that may be easily modified and implemented by using the exemplary embodiments. Therefore, the scope of the present disclosure should not be limited to the above-described exemplary embodiments, but should be determined by the claims and equivalents of the present disclosure as well as the claims described below.

What is claimed is:

1. A method of operating an electronic device configured to provide tourism information about a cultural heritage, the method comprising:

obtaining user information;

providing first tourism information corresponding to the user information from a pre-stored tourism database; and providing second tourism information on the basis of the user information, wherein the second tourism information is information related to the first tourism information, wherein the pre-stored tourism database comprises tourism data about the cultural heritage, and the tourism data is divided into visual information and non-visual information, wherein the pre-stored tourism database is a cultural heritage map defined as structured data in which cultural heritage data is stored in an ontology, wherein the method further comprises:

receiving a search expression based on the visual information including at least one of meaning of the cultural heritage, use of the cultural heritage and classification of the cultural heritage; and providing attribute information about a cultural heritage of interest, a list of related recommended cultural heritages, and weight information after searching for information about a related cultural heritage through the cultural heritage map based on the search expression, and wherein the providing of the second tourism information comprises:

generating customized interpretation information based on the attribute information, the list of related recommended cultural heritages and the weight information.

2. The method of claim 1, wherein the second tourism information is natural language-based interpretation information for the first tourism information.

3. The method of claim 1, wherein the user information comprises information about a visitor who is viewing the cultural heritage, and comprises at least one of personal information, interest information, history information, and restricted information of the visitor.

4. The method of claim 1, wherein the providing of the first tourism information comprises:

setting a first recommendation criterion on the basis of the user information;

determining at least one cultural heritage as a recommendation target on the basis of the first recommendation criterion; and generating recommendation information about the recommendation target.

5. The method of claim 4, wherein the providing of the second tourism information comprises:

generating customized interpretation information for the user corresponding to the user information on the basis of the recommendation information and the user information, and the customized interpretation information is generated on the basis of at least one of the personal information, history information, interest information, and restricted information of the user.

6. An electronic device configured to provide tourism information about a cultural heritage, the electronic device comprising:

a transceiver; and at least one control unit operably connected to the transceiver, wherein the at least one control unit is configured to perform steps comprising:

obtaining user information;

providing first tourism information corresponding to the user information from a pre-stored tourism database; and providing second tourism information on the basis of the user information, and the second tourism information is information related to the first tourism information, wherein the pre-stored tourism database comprises tourism data about the cultural heritage, and the tourism data is divided into visual information and non-visual information, wherein the pre-stored tourism database is a cultural heritage map defined as structured data in which cultural heritage data is stored in an ontology, wherein the method further comprises:

receiving a search expression based on the visual information including at least one of meaning of the cultural heritage, use of the cultural heritage and classification of the cultural heritage; and providing attribute information about a cultural heritage of interest, a list of related recommended cultural heritages, and weight information after searching for information about a related cultural heritage through the cultural heritage map based on the search expression, and wherein the providing of the second tourism information comprises:

generating customized interpretation information based on the attribute information, the list of related recommended cultural heritages and the weight information.

7. The electronic device of claim 6, wherein the second tourism information is natural language-based interpretation information for the first tourism information.

8. The electronic device of claim 6, wherein the user information comprises information about a visitor who is viewing the cultural heritage, and comprises at least one of the personal information, interest information, history information, and restricted information of the visitor.

9. The electronic device of claim 6, wherein, in order to perform the providing of the first tourism information, the at least one control unit is configured to further perform steps comprising:

setting a first recommendation criterion on the basis of the user information;

determining at least one cultural heritage as a recommendation target on the basis of the first recommendation criterion; and generating recommendation information about the recommendation target.

10. The electronic device of claim 9, wherein, in order to perform the providing of the second tourism information, the at least one control unit is configured to perform a step of:

generating customized interpretation information for the user corresponding to the user information on the basis of the recommendation information and the user information, and the customized interpretation information is generated on the basis of at least one of the personal information, history information, interest information, and restricted information of the user.

* * * * *